United States Patent
Faunce et al.

(10) Patent No.: US 7,313,553 B2
(45) Date of Patent: Dec. 25, 2007

(54) APPARATUS AND METHOD FOR USING VALUES FROM A FREQUENT VALUES LIST TO BRIDGE ADDITIONAL KEYS IN A DATABASE INDEX

(75) Inventors: Michael S. Faunce, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 10/815,231

(22) Filed: Mar. 31, 2004

(65) Prior Publication Data

US 2005/0228772 A1 Oct. 13, 2005

(51) Int. Cl.
*G06F 17/30* (2006.01)

(52) U.S. Cl. .................... 707/2; 707/4; 707/5
(58) Field of Classification Search ................. 707/2–7
See application file for complete search history.

(56) References Cited

U.S. PATENT DOCUMENTS

| | | | |
|---|---|---|---|
| 6,513,028 B1* | 1/2003 | Lee et al. | 707/2 |
| 2004/0122845 A1* | 6/2004 | Lohman et al. | 707/102 |
| 2004/0225639 A1* | 11/2004 | Jakobsson et al. | 707/2 |
| 2005/0097084 A1* | 5/2005 | Balmin et al. | 707/3 |

\* cited by examiner

*Primary Examiner*—Hosain Alam
*Assistant Examiner*—Ahn Sangwoo
(74) *Attorney, Agent, or Firm*—Martin & Associates, LLC; Derek P. Martin

(57) ABSTRACT

A database query optimizer determines when no optimal index for a query exists, determines whether a sub-optimal index exists, and if so, uses statistical information for each additional key in the sub-optimal index to rewrite the query in a manner that allows traversing the sub-optimal index. The sub-optimal index is then probed using the rewritten query, and the number of estimated returned rows is then used to optimize the query.

5 Claims, 5 Drawing Sheets

Select * from MyTable
where StoreID = 001 and CustID in (5,7)

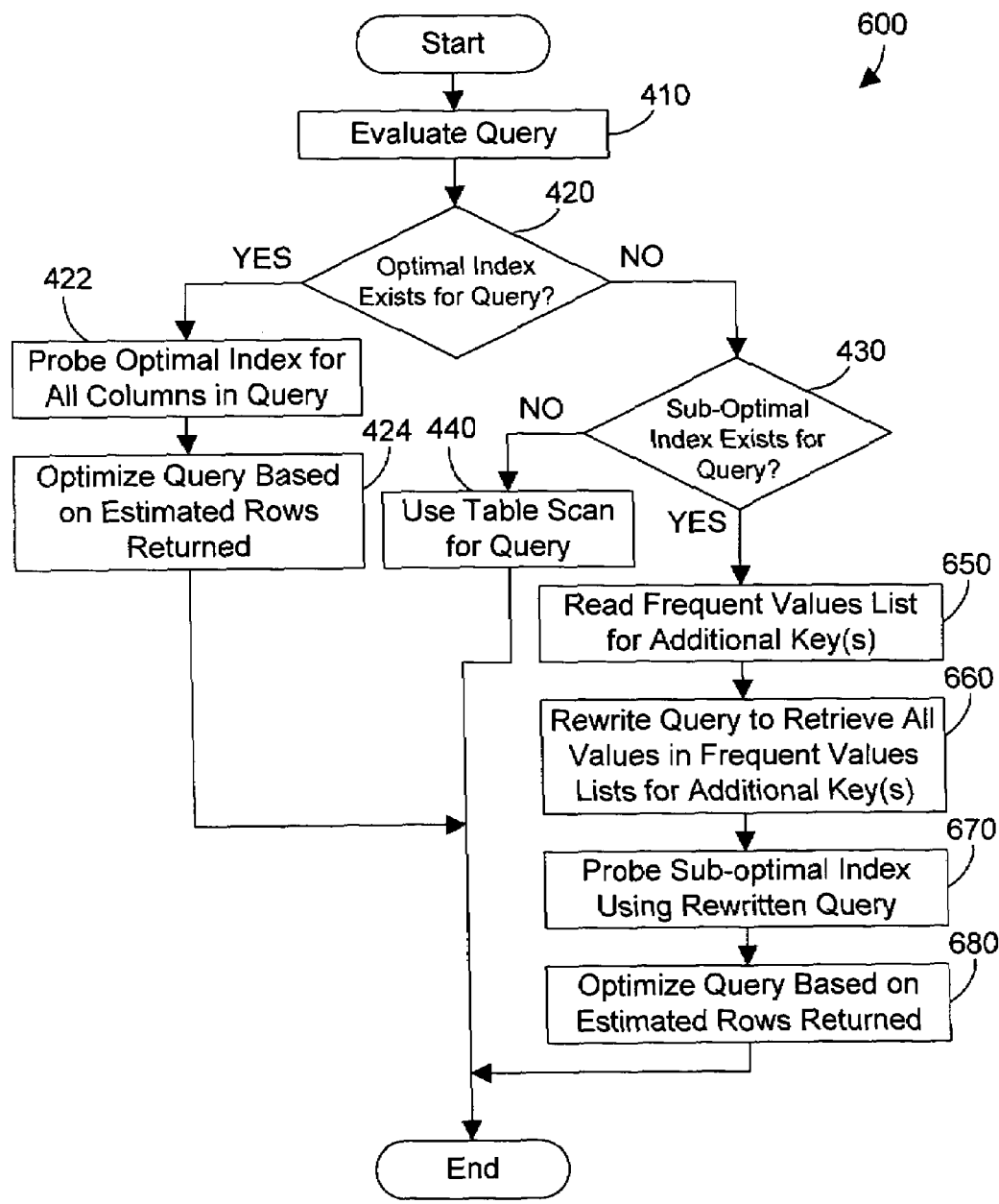

Frequent Values List (FVL) over CustStatus

| Value | Count |
|---|---|
| A | 6 |
| E | 2 |
| D | 2 |

FIG. 7

Select * from MyTable
where StoreID = 001 and CustStatus in (A,E,D) and
CustID in (5,7)

APPARATUS AND METHOD FOR USING VALUES FROM A FREQUENT VALUES LIST TO BRIDGE ADDITIONAL KEYS IN A DATABASE INDEX

BACKGROUND OF THE INVENTION

1. Technical Field

This invention generally relates to computer systems, and more specifically relates to apparatus and methods for optimizing a database query.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

Queries that are frequently run may be optimized to enhance system performance. In order to optimize a query, a query optimizer must be able to estimate the number of rows that the query will return. This estimate may then be used by the query optimizer to determine how to most efficiently execute the query. When an optimal index for the query exists, the optimal index may be probed using the keys that correspond to columns in the query to determine the number of rows that satisfy the query. When an optimal index for the query does not exist, but a sub-optimal index exists, the sub-optimal index may be probed. However, this sub-optimal index includes one or more additional keys that prevent traversing the sub-optimal index. The query optimizer may go ahead and use the number of rows returned as an estimate for rows that satisfy the query, and optimize the query accordingly. However, this estimate is flawed because of the one or more additional keys that prevent traversing the index. As a result, the index cannot be probed below the additional key. Thus, known query optimizers cannot make accurate optimizations to a query when only a sub-optimal index is available. Without a way to use a sub-optimal index to more accurately estimate the number of rows the query will return, the computer industry will continue to suffer from query optimizers that cannot accurately optimize queries when an optimal index is not available.

DISCLOSURE OF INVENTION

According to the preferred embodiments, a database query optimizer determines when no optimal index for a query exists, determines whether a sub-optimal index exists, and if so, uses statistical information for each additional key in the sub-optimal index to rewrite the query in a manner that allows traversing the sub-optimal index. The sub-optimal index is then probed using the rewritten query, and the number of estimated returned rows is then used to optimize the query.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 shows probe values generated in the prior art for the query in FIG. 2 to probe the sub-optimal index shown in FIG. 3;

FIG. 6 shows a method for optimizing database queries in accordance with the preferred embodiments;

FIG. 7 is a sample frequent values list for the CustStatus column in the table in FIG. 3;

FIG. 8 is the query of FIG. 2 after being rewritten according to the frequent values of the additional CustStatus key in the index in FIG. 3; and FIG. 9 shows probe values used to probe the index of FIG. 3 in accordance with the preferred embodiments.

BEST MODE FOR CARRYING OUT THE INVENTION

1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figures 2, 4:
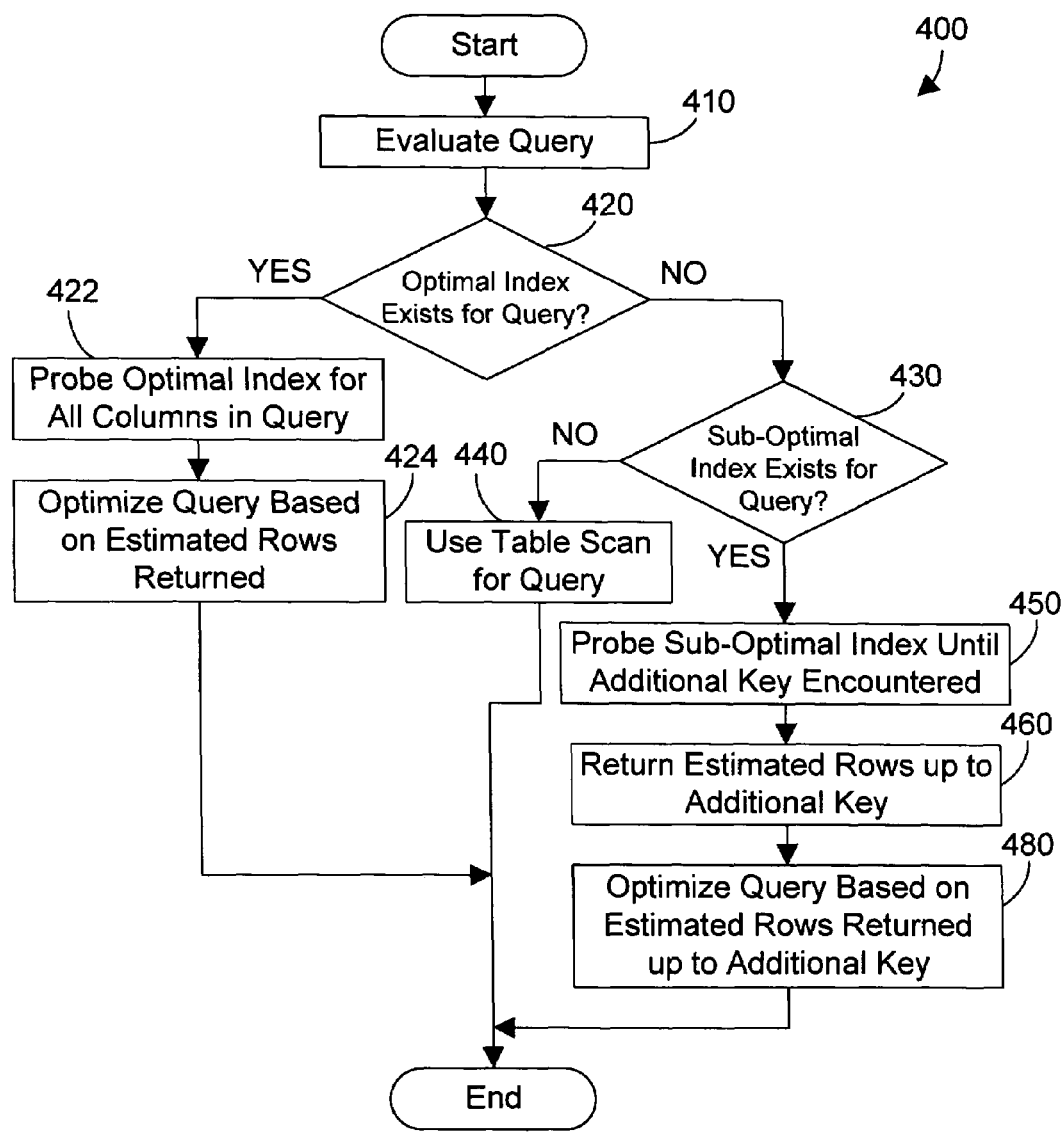
FIG. 2 shows a sample database query in Structured Query Language (SQL) for the database table shown in FIG. 3.
FIG. 4 is a flow diagram of a prior art method for optimizing a query.

One popular way to define a query uses Structured Query Language (SQL). SQL defines a syntax for generating and processing queries that is independent of the actual structure and format of the database. One sample SQL query is shown in FIG. 2. The "select*" statement tells the database query processor to select all values, the "from MyTable" statement identifies which database table to search, and the "where" clause specifies one or more expressions that must be satisfied for a record to be included in the resulting dataset. Note that the query of FIG. 2 is expressed in terms of columns StoreID and CustID, which are columns defined on the database table MyTable 300 shown in FIG. 3. Information about the internal storage of the data is not required as long as the query is written in terms of expressions that relate to values in columns from tables.

Figure 3:
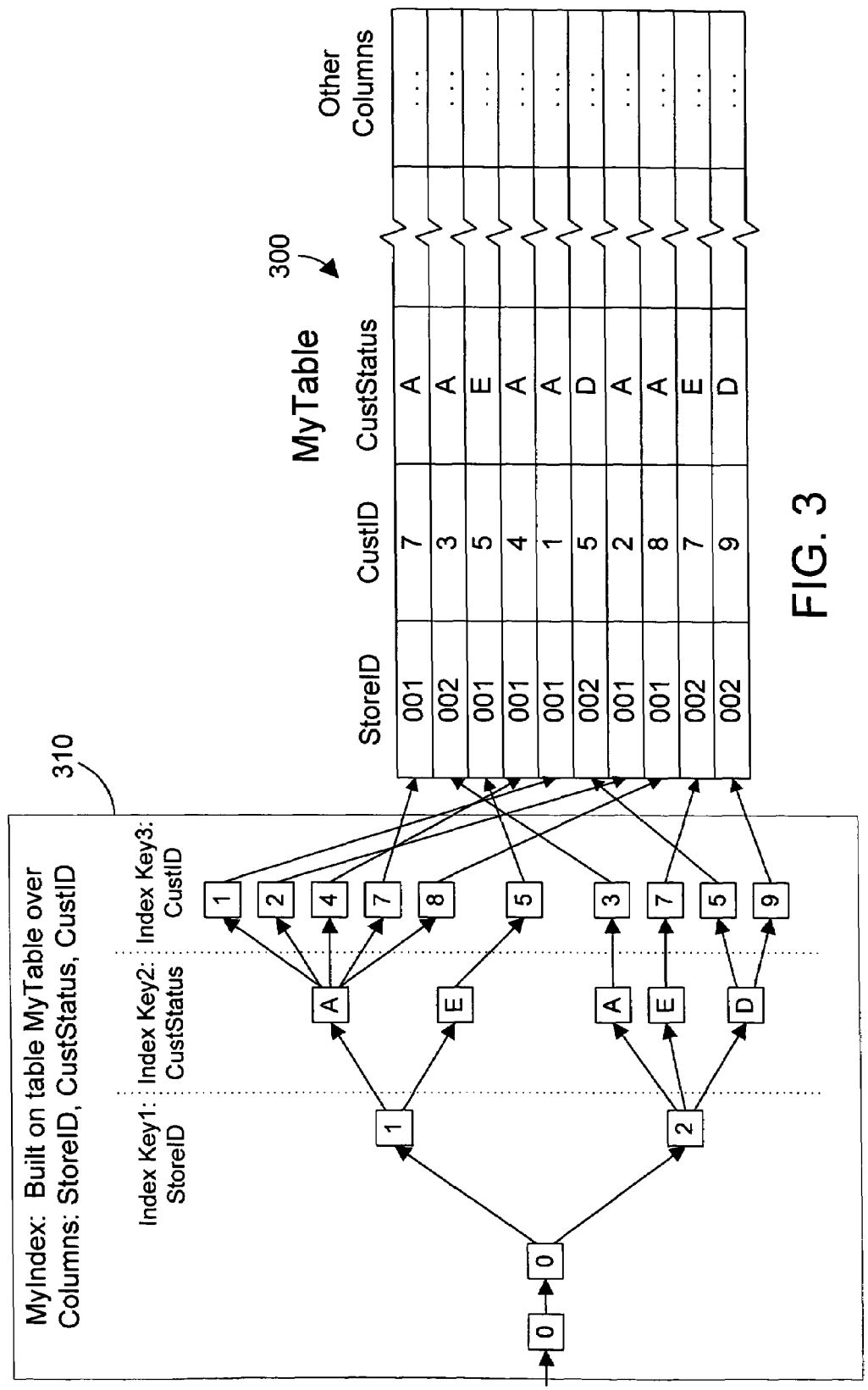
FIG. 3 shows a sample database table for the query in FIG. 2 and an associated index for the database table.

The sample table MyTable 300 is shown in FIG. 3. MyTable 300 is a suitable table that the query of FIG. 2 could be run against. MyTable 300 includes multiple rows and multiple columns. An index 310 is an example of an index that exists for table 300. An optimal index for the query in FIG. 2 would include either the StoreID or the CustID at the top level of the index, and would have the other key (StoreID or CustID) at the next level down in the index. Note that index 310 in FIG. 3 includes the keys StoreID and CustID that are specified in the query of FIG. 2. However, index 310 additionally includes the key CustStatus interposed between the StoreID and CustID keys, and is therefore a sub-optimal index. As used herein, the term "optimal index" means an index that includes all of the keys in the query arranged so that probing the index with the keys in the query returns the rows that satisfy the query. The term "sub-optimal index" as used herein means an index that includes one or more of the keys in the query but that has one or more additional keys in the index that prevents traversal of the sub-optimal index to determine the number of rows that the query will return.

When no optimal index exists, the prior art must make assumptions based on a sub-optimal index. As shown in FIG. 4, a prior art method 400 begins by evaluating a query (step 410). The evaluation of the query identifies the columns that are referenced in the query. Method 400 then determines whether an optimal index exists for the query (step 420). If so (step 420=YES), the optimal index is probed for the keys that correspond to all columns in the query (step 422), and the query is optimized based on the estimated number of rows returned (step 424). If there is no optimal index for the query (step 420=NO), method 400 determines whether a sub-optimal index exists for the query (step 430). If not (step 430=NO), a table scan is used to execute the query (step 440). If a sub-optimal index exists for the query (step 430), the sub-optimal index is probed until an additional key is encountered that prevents further traversing the sub-optimal index (step 450). The estimate of rows returned up to the additional key is returned (step 460). The query is then optimized based on the estimated rows returned when probing the sub-optimal index up to the point of the additional key (step 480).

We now apply method 400 to the query in FIG. 2 and the table 300 and index 310 in FIG. 3. When the query is evaluated in step 410, it is determined that the StoreID and CustID are columns in the query. We assume in step 420 that no optimal index exists for this query (step 420=NO). We further assume that index 310 exists, which is a sub-optimal index for the query (step 430=YES) because it includes the StoreID key and CustID key that correspond to the columns in the query, but has an additional key CustStatus interposed between the two that prevents traversal of the index using only the StoreID and CustID keys. The sub-optimal index 310 is then probed (step 450). The query in FIG. 2 gives the probe values in FIG. 5 that are typically used to probe index 310. These probe values are the concatenation of the StoreID value with the CustID values. Note, however, that because the index is sub-optimal, the probe values cannot be used as-is. Instead, they must be broken up into their component parts. Thus, we first probe the index 310 with the value 001 for StoreID. At this point we encounter the CustStatus key, which is an additional key that prevents traversing the index any further. Probing the index 310 with 001 for StoreID returns an estimate of 6 records, or 60% of the records in the table (step 450). CustID is also part of the index 310, but we can only guess as to how selective that criteria may be since we cannot probe this portion of the index. For a large table, this estimate of 60% may cause a decision to be made to do a table scan because so much of the table is being processed. Without a way for making an intelligent decision when using a sub-optimal index, the prior art will continue to make wrong choices when optimizing a query using a sub-optimal index.

2.0 Description of the Preferred Embodiments

The present invention provides a way to use a sub-optimal index in a way that uses statistics information for index keys that are not referenced in the query to traverse the index. The statistics information is used to rewrite the query in a way that bridges any gaps in the index caused by additional keys, thereby allowing probing of the index to estimate the number of rows the query will return.

Figure 1:
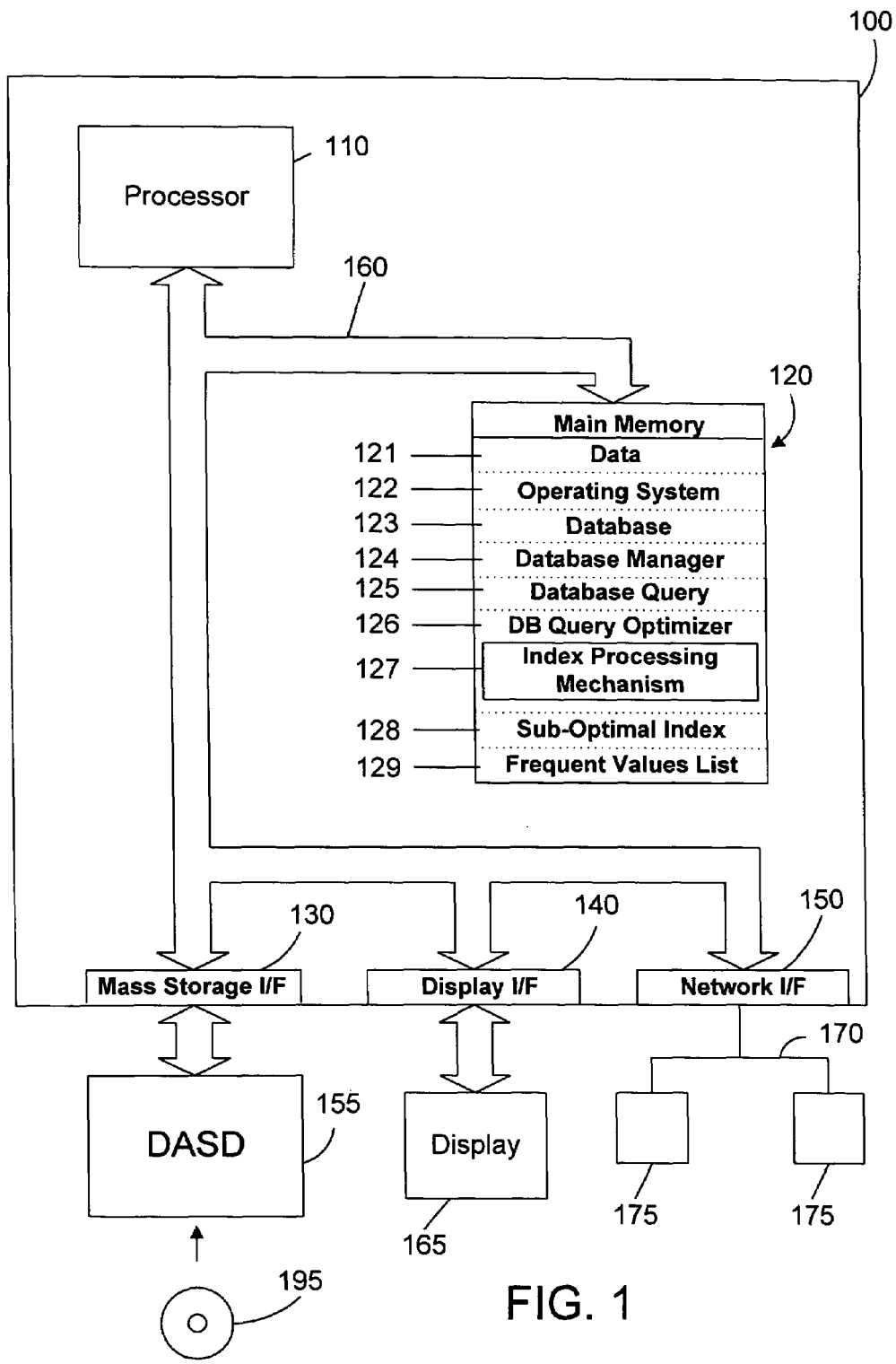
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 124, one or more database queries 125, a database query optimizer 126, a sub-optimal index 128, and a frequent values list 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Database manager 124 provides an interface to database 123, processing queries and returning the query results. Database query 125 is a query in a format compatible with the database 123 that allows retrieval of information stored in the database 123 that satisfies the database query 125. Database query optimizer 126 processes database query 125 to optimize database query 125. Database query optimizer 126 includes an index processing mechanism 127 that may process a sub-optimal index 128 for query 125 using statistical information from the frequent values list 129 to bridge gaps in the sub-optimal index 128. The sub-optimal index 128 is sub-optimal from the point of view of the query 125, which means that the sub-optimal index 128 includes one or more of the keys corresponding to columns referenced in the query 125 and additionally includes one or more additional keys that prevent traversing the sub-optimal index 128 to determine from the index 128 the number of rows that the database query 125 will return. While database query optimizer 126 is shown in FIG. 1 to be separate from the other items in main memory 120, it is also within the scope of the preferred embodiments to include the database query optimizer 126 as part of the database manager 124, or as part of any other computer program.

The frequent values list 129 includes statistical information for a database table in the form of a list of values for a specified column in a database table, and indicates the count of the most frequent values. Frequent values lists are common and known in the art. A sample frequent values list 129 for the CustStatus column in the table 300 in FIG. 3 is shown in FIG. 7. A frequent values list typically includes a threshold value, and values that have a count above the threshold are included in the frequent values list while values that have a count below the threshold are excluded from the frequent values list. In the alternative, the threshold may be defined in terms of storing the N most frequent values. In this manner, only the most frequent values are stored in the frequent values list.

Most database systems may maintain a separate frequent values list for each column in a database, or may maintain a separate frequent values list for some subset of columns in the database. Of course, frequent values for multiple columns in a single list could also be maintained. The index processing mechanism 127 may access and use the frequent values list corresponding to each additional key in the sub-optimal index 128 that prevents the sub-optimal index from being traversed to determine a number of rows returned by the query 125. The index processing mechanism 127 essentially re-writes the query 125 using the statistical information in the frequent values list 129 so that the sub-optimal index 128 may be used to estimate the number of rows that will be returned when processing the query 125.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 124, database query 125, database query optimizer 126, sub-optimal index 128, and frequent values list 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Referring to FIG. 6, a method 600 in accordance with the preferred embodiments optimizes a query. Note that steps 410, 420, 422, 424, 430 and 440 are preferably identical to the steps shown in FIG. 4 and described in detail above. The difference between prior art method 400 and method 600 in accordance with the preferred embodiments is what happens when a sub-optimal index exists for the query (step 430=YES). In this case, the frequent values list is read for each additional key in the sub-optimal index that prevents traversing the sub-optimal index to estimate a number of rows that will be returned by the query (step 650). The query is then rewritten to retrieve all the values in the frequent values lists for the additional keys (step 660). Note that step 660 preferably uses all the values in the frequent values list, but could optionally use less than all of the values in the frequent values list. The sub-optimal index is then probed using the rewritten query (step 670). The query is then optimized based on the estimated rows returned from probing the sub-optimal index with the rewritten query (step 680). In prior art method 400, an additional key that prevented traversing the sub-optimal index acted like a roadblock that prevented any additional information from being gleaned from the sub-optimal index. In method 600 in accordance with the preferred embodiments, the gap caused by an additional key is bridged by using the values from its frequent values list to rewrite the query to include all of the values in the frequent values list. Note that steps 650 and 660 may be performed multiple times, once for each additional key in the sub-optimal index that prevents traversing the index to estimate the number of rows that the query will return.

We now apply method 600 of FIG. 6 to the table 300 and index 310 in FIG. 3. The query in FIG. 2 is evaluated (step 410). We assume that there is no optimal index for the query (step 420=NO). Index 310 is a sub-optimal index for the query (step 430=YES), because the index 310 includes an additional key CustStatus that prevents traversing the index to estimate the number of rows returned by the query. At this point, the frequent values list for the additional key, namely CustStatus, is read (step 650). We assume the frequent values list for CustStatus is shown in FIG. 7. Now, using the information from the frequent values list in FIG. 7, the query is rewritten internally to retrieve all the values in the frequent values list (step 660). The result of rewriting the query in step 660 is shown in FIG. 8. Note that the rewritten query includes the original columns and corresponding values, and additionally includes the three most frequent values for CustStatus, namely A, E and D, that are listed in the frequent values list in FIG. 7. Now we can probe the sub-optimal index 310 using this rewritten query (step 670). While FIG. 5 shows probe values for the original query, FIG. 9 shows probe values for the rewritten query. These probe values provide all combinations of values in the query. By following these probe values through the index 310, we see that only probe values 001A7 and 001E5 return a record, whereas the other probe values do not. Thus, the probe of the sub-optimal index in step 670 estimates two records, or 20%. The query may then be optimized based on the number of rows returned from probing the index in step 670 (step 680).

Note that the prior art method 400 in FIG. 4 returned an estimate of 60% of the rows being selected by the query. An estimate of 20% selectivity using method 600 is much more accurate than the estimate of 60% selectivity using prior art method 400. By using the statistical information in the frequent values list, the method 600 of FIG. 6 bridges gaps in the index, resulting in an estimate that is much better than using the prior art method 400.

The query may be optimized in step 680 by implementing the query with the sub-optimal index in a manner that assures we do not miss any rows. Missing rows could occur, for example, if the frequent values list is slightly out of date. First, we probe on the leading key of the index, "001" in this case, and ask for the *MIN value for Key 2, which returns one missing Key 2 value "A". We save this position as our current position in the index. Then we build up ranges to probe the index with probe values 001A5 and 001A7, which returns one record, the first row in the table from the 001A7 probe value. Next, using the current position in the index we ask for the *NEXT Key 2 which returns "E". Then we again build our probe values of 001E5 and 001E7 to probe the index. This probe returns the third row of the table, from the 001 E5 probe value. Last, we use the current position in the index and ask for the *NEXT Key 2 , which returns null since there are no more Key 2 values at this point in the index tree. Thus, the query implementation terminates, and rows are returned to the user. In the alternative, rows may be returned to the user as the rows are found. Alternatively, the query optimizer may perform the following query:

select distinct (CustStatus) from MyTable and store the resulting dataset into a Temp result. The Temp result may then be joined into an index probe using the full key.

By bridging gaps in a sub-optimal index, the query optimizer of the preferred embodiments provides much better information for optimizing a query when only a sub-optimal index is available. The gaps caused by additional keys in the index that prevent traversing the index are bridged by rewriting the query to include values in the frequent values list for each additional key. The index may then be probed using the rewritten query to more accurately determine an estimate of the number of rows returned by the query.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a database table residing in the memory;
   a query residing in the memory that accesses the database table; and
   a query optimizer residing in the memory and executed by the at least one processor, wherein the query optimizer analyzes the query, and if no optimal index for the query exists, the query optimizer determines if a sub-optimal index exists, a sub-optimal index including at least one key referenced in the query and additionally including at least one additional key that prevents traversal of the sub-optimal index to determine the number of rows that the query will return, wherein if a sub-optimal index exists, the query optimizer, for each additional key in the sub-optimal index, reads a frequent values list that corresponds to the additional key, the query optimizer rewriting the query using the frequent values list in a manner that allows probing the sub-optimal index according to the rewritten query, the query optimizer thereby determining from the sub-optimal index an estimated number of rows in the database table that satisfy the query, the query optimizer optimizing the query based on the estimated number of rows in the database table that satisfy the query.

2. An apparatus comprising:
   at least one processor;
   a memory coupled to the at least one processor;
   a database table residing in the memory;

a query residing in the memory that accesses the database table;

an index residing in the memory that includes at least one key referenced in the query and additionally includes at least one additional key that prevents traversal of the index to determine the number of rows that the query will return; and a query optimizer residing in the memory and executed by the at least one processor, wherein the query optimizer, for each additional key in the index, reads a frequent values list that corresponds to the additional key, the query optimizer rewriting the query using the frequent values list in a manner that allows probing the index according to the rewritten query, the query optimizer thereby determining from the index an estimated number of rows in the database table that satisfy the query, the query optimizer optimizing the query based on the estimated number of rows in the database table that satisfy the query.

3. A method for optimizing a database query for a database table, the method comprising the steps of:
   (1) analyzing the query;
   (2) if no optimal index for the query exists, determining if a sub-optimal index exists, a sub-optimal index including at least one key referenced in the query and additionally including at least one additional key that prevents traversal of the sub-optimal index to determine the number of rows that the query will return;
   (3) if a sub-optimal index exists, performing the following steps for each additional key in the sub-optimal index that prevents traversal of the sub-optimal index to determine the number of rows that the query will return:
      (A) reading a frequent values list that corresponds to the additional key; and
      (B) rewriting the query using the frequent value list in a manner that allows probing the sub-optimal index according to the rewritten query;
   (4) probing the sub-optimal index using the rewritten query;
   (5) determining from the probe of the sub-optimal index an estimated number of rows in the database table that satisfy the query; and
   (6) optimizing the query based on the estimated number of rows in the database table that satisfy the query.

4. A computer-readable program product comprising:
   (A) a query optimizer that analyzes a query for a database table, and if no optimal index for the query exists, the query optimizer determines if a sub-optimal index exists, a sub-optimal index including at least one key referenced in the query and additionally including at least one additional key that prevents traversal of the sub-optimal index to determine the number of rows that the query will return, wherein if a sub-optimal index exists, the query optimizer, for each additional key in the sub-optimal index, reads a frequent values list that corresponds to the additional key, the query optimizer rewriting the query using the frequent values list in a manner that allows probing the sub-optimal index according to the rewritten query, the query optimizer thereby determining from the sub-optimal index an estimated number of rows in the database table that satisfy the query, the query optimizer optimizing the query based on the estimated number of rows in the database table that satisfy the query; and
   (B) recordable media bearing the query optimizer.

5. A computer-readable program product comprising:
   (A) a query optimizer that processes a query for a database table using a sub-optimal index that includes at least one key referenced in the query and additionally includes at least one additional key that prevents traversal of the sub-optimal index to determine the number of rows that the query will return, wherein the query optimizer, for each additional key in the index, reads a frequent values list that corresponds to the additional key, the query optimizer rewriting the query using the frequent values list in a manner that allows probing the index according to the rewritten query, the query optimizer thereby determining from the index an estimated number of rows in the database table that satisfy the query, the query optimizer optimizing the query based on the estimated number of rows in the database table that satisfy the query; and
   (B) recordable media bearing the query optimizer.

* * * * *